United States Patent Office 3,085,994
Patented Apr. 16, 1963

3,085,994
CHAIN TERMINATED COPOLYMER OF STYRENE AND MALEIC ANHYDRIDE OF LOW SOLUTION VISCOSITY
Irving E. Muskat, Miami, Fla., assignor, by mesne assignments, to Sinclair Research, Inc., a corporation of Delaware
No Drawing. Filed Oct. 30, 1959, Ser. No. 849,706
4 Claims. (Cl. 260—78.5)

The present invention relates to new low molecular weight copolymers of styrene and maleic anhydride and the production thereof. In many instances it seems reasonable to conclude that the copolymer comprises alternating styrene and maleic anhydride groups and can be termed a heteropolymer.

This application is a continuation-in-part of my application Serial No. 637,890, filed February 4, 1957, now abandoned.

It has been proposed heretofore to copolymerize styrene and maleic anhydride in the presence of a free-radical generating polymerization catalyst (typically an organic peroxide) in an inert liquid which is a solvent for the monomers but not for the copolymer which is produced. Various hydrocarbons and chlorinated hydrocarbons have been used as the inert solvent, particularly benzene, toluene and xylene.

The prior processes are well represented by the teachings of United States Patents to Condo et al. No. 2,286,062 and Vana No. 2,430,313. In these processes styrene and maleic anhydride are dissolved in xylene, the solution is heated to a reaction temperature of about 80–100° C. and peroxide catalyst is then added to effect polymerization. When the styrene used is impure, the reaction is sluggish and the impure polymer particles which precipitate, agglomerate together at about 95° C. to form a taffy-like mass which is impractical to stir or otherwise handle. When relatively pure styrene is used, and at temperatures of above about 90° C., the reaction tends to become uncontrollable when even minimum concentrations of monomers are present, e.g., 5–10% and there is serious danger of a run-away reaction despite vigorous agitation and cooling. While it is known that increasing reaction temperature and/or catalyst concentration tends to lower molecular weight, these expedients are not adequate with solvents such as benzene and xylene and such expedients materially increase the danger of explosive reaction. Slow addition of catalyst is of some assistance in reducing danger of explosive reaction but the non-uniform distribution of catalyst in the reaction mixture leads to non-uniform products. The control associated with continuous processing is of some assistance, but in the known continuous processes, unreacted monomers accumulate to concentrations in the range of 5–20% and the presence of large amounts of finely divided suspended copolymer makes cooling inefficient. Thus, continuous processing aggravates the danger of explosive reaction and the art is taught to use a catalyst concentration of less than 1.5% based on monomers. Continuous processing of styrene and maleic anhydride is taught in United States patent to Barrett No. 2,675,370 which illustrates the reaction using 80° C. and addition of fresh monomer-containing solution at the rate of about 10% of the reactor volume per hour. Since the conventional polymerization solvents are not adequately effective to control molecular weight, chain transfer agents such as mercaptans have been used, but these have not previously been adequate to provide the low molecular weight achieved by the invention and they contaminate the polymeric product which is produced and are detrimental for many purposes.

In accordance with the invention, styrene and maleic anhydride in molar proportions of about 1:2 to about 2:1 are dissolved, together with a free-radical generating polymerization catalyst, in certain selected solvents in which the monomer reactants are soluble but in which the copolymer product is insoluble and which function to terminate the copolymerization reaction. Heat is then employed to initiate an exothermic polymerization reaction, temperatures of from 75–200° C. being broadly suitable. The temperature of reaction is selected to prevent fusion and agglomeration of precipitated copolymer particles which would produce a porous mass which strongly resists stirring and which may entrap large proportions of reaction liquid. Such fusion and agglomeration of precipitated particles in accordance with the invention is avoided either by maintaining the temperature of reaction below the point at which any substantial proportion of precipitated copolymer will fuse to cause agglomeration or by conducting the polymerization reaction at a temperature which will melt any precipitated copolymer providing a molten mass which can be effectively agitated.

The new low molecular weight copolymers of the invention are characterized by low solution viscosity which adapts them for use as components of low pressure molding compositions as well as for various other utilities in which the new copolymers are distinguished by virtue of uniform low molecular weight. The new copolymers of the invention are further characterized by low melting point, narrow melting range and, in some instances, by substantial proportions of combined solvent terminating agent.

The prior art styrene-maleic anhydride copolymers are not well adapted for use as components of molding compositions due to their excessive and frequently non-uniform character manifested by high solution viscosity. As a result, mixtures of the prior copolymers with glycols require molding pressures of the order of 1000 to 3000 p.s.i. and higher using temperatures of the order of 130–200° C. and are further characterized by poor flow. Lack of copolymer uniformity is further detrimental since it leads to non-uniform flow and non-uniform reaction with glycols and this further limits the utility of prior copolymers for molding purposes.

The maleic anhydride-styrene copolymers of the invention having solution viscosity at 25° C. in concentration of 10 grams of polymer dissolved in acetone to form 100 milliliters of solution (10%) of up to 7 centistokes, preferably up to about 1 centistoke, are easily moldable in admixture with glycols at pressures of the order of about 10–100 p.s.i., using temperatures in the range of 130–200° C. The uniformity of low molecular weight achieved by the invention is particularly beneficial since such uniform products possess uniform flow properties which is of importance to commercial molding procedures.

Preferred copolymers in accordance with the invention are further characterized by melting points below 255° C. and more preferably below 225° C. Moreover, preferred copolymers produced in accordance with the invention are found to melt (final readings made on a sample previously fused in the apparatus) over a range of less than 15° C. Melting points and melting range were determined using the Fisher-John's melting point apparatus as described in the publication "Modern Laboratory Appliances" published by the Fisher Scientific Company in its publication number 111 at page 575. Molecular weight measurements by boiling point elevation technique indicate that copolymers produced in accordance with the invention frequently have molecular weights of less than 3000 and, when preferred practice of the invention is followed, the molecular weight is in many instances less than 2000.

It is desired to point out that present procedures for the high speed molding of infusible products require high pressure substantially limiting high speed practices to the production of small molded pieces. To produce larger pieces, the art has employed hand lay-up procedures which are slow and costly. The invention provides an important contribution toward the feasibility of low pressure molding enabling conventional high speed molding procedures to be applied to the production of large infusible molded pieces.

The low molecular weight copolymers of the invention are uniquely adapted toward diverse other purposes. Thus, solutions of higher solids content at any given viscosity may be provided, irrespective of whether the copolymers of the invention are dissolved in organic solvent medium or hydrolyzed and dissolved in aqueous alkaline medium. Moreover, the low uniform molecular weight achieved by the invention enables greater compatibility with other resinous components in solution as well as enhanced and more uniform reactivity in cross-linking reactions as, for example, with glycols and other aliphatic polyhydric compounds.

The new copolymers of the invention may be produced by what is termed an enmasse procedure. In the enmasse polymerization procedure, the maleic anhydride and styrene monomers together with up to about 1% by weight of benzoyl peroxide or corresponding proportion of other free-radical generating polymerization catalyst are dissolved in certain selected organic solvents which will be more fully defined hereinafter and the entire solution is subjected to polymerization as a single unit.

Dissolving is effected at a temperature at which no significant polymerization can take place within reasonable operating time, e.g., less than about 75° C. The solution so produced is placed in a reaction vessel and heated to a temperature of about 75–80° C. to initiate the polymerization reaction. This polymerization reaction is strongly exothermic and becomes more rapid with increasing reaction temperature. Agitation and cooling are employed to prevent the reaction from becoming uncontrollably explosive. As the reaction proceeds the proportion of unreacted monomers remaining in the reaction liquid is reduced and the temperature is desirably permitted to increase, care being taken to regulate the temperature carefully to prevent it from getting out of hand. At the start of the reaction, and especially when the solvent medium contains more than 10% by weight of monomers, temperatures above 90° C. are dangerous. After some substantial precipitation of polymer has occurred, the temperature may be permitted to rise to about 110° C. After the exothermic reaction has subsided, it is desirable to continue heating to obtain high conversion and this may be achieved using temperatures in the range of 80–135° C., depending upon the nature of the solvent. Preferably, the more elevated temperatures of 125–135° C. are used and heating is desirably applied for a period of from 1 to 3 hours after the exotherm has subsided.

It is desired to point out that the enmasse reaction procedure is not the preferred procedure. Among the solvents which may be selected in accordance with the invention is the least preferred solvent, ethylbenzene. Using the enmasse reaction procedure and ethylbenzene as solvent, the molecular weight of the product is lowered far below that conventionally achieved by the prior art using, for example, benzene or xylene, but the product produced enmasse using ethylbenzene merely represents the approximate upper limit of feasibility in accordance with the invention. Far superior results are achieved using either the various other solvents which may be selected in accordance with the invention and/or by employing the unique incremental addition procedure which will now be described.

In accordance with the incremental reaction procedure of the invention, catalyst and monomer reactants are simultaneously supplied to a reaction vessel containing a portion of the selected solvent at the reaction temperature and at a rate not substantially in excess of the rate of conversion of monomer to polymer. This is preferably effected by addition of a solution containing catalyst and monomer reactants all dissolved in the selected solvent. However, if desired, the monomers can be dissolved in one portion of selected solvent and the catalyst dissolved in a second portion of selected solvent and both solutions supplied simultaneously to the reaction vessel containing selected solvent at reaction temperature. In this way, the monomer-containing solution is more stable and may be supplied at a temperature different from the temperature of the catalyst-containing solution, e.g., the catalyst-containing solution may be supplied at a low temperature where it is more stable and the monomer-containing solution may be supplied at a higher temperature where the selected solvent can tolerate a higher proportion of dissolved monomers. Indeed, in view of the fact that the monomer-containing solution in preferred practice of the incremental addition process is supplied to a large volume of vigorously agitated selected solvent containing a minimum proportion of unreacted monomers and maintained at very elevated temperatures, substantially instantaneous solution of monomers in the selected solvent within the reaction vessel becomes feasible and the monomer-containing solution may contain suspended monomers, particularly suspended maleic anhydride. Indeed, since maleic anhydride is quite soluble in styrene, the maleic anhydride may be dissolved in the styrene and supplied without predissolving of these monomers in the selected solvent. To insure uniform and substantially instantaneous admixture of catalyst in the reaction liquor and as a safety precaution, the catalyst, particularly if it is slow dissolving, is desirably first dissolved in a portion of the selected solvent. Of course, as stated above, the catalyst may be dissolved in the reactive ingredients or added separately but simultaneously to the reaction vessel.

While it is feasible to employ reaction temperatures of 80–90° C. and small proportions of catalyst, as in the enmasse procedure, the incremental addition procedure under these conditions does not produce higher conversions or reaction rates although improved product uniformity is obtained. Moreover, under these conditions of low reaction temperature and low catalyst concentration, unless the monomer-containing solution is added slowly, operation, particularly on a continuous basis, causes the accumulation of unreacted monomers which increases the danger involved.

In accordance with the invention, monomers and catalyst are added incrementally to a portion of selected solvent or previously reacted solution maintained at more elevated temperature. Preferably, the concentration of catalyst in the added solution is increased and is in the range of from 2–5% by weight of catalyst based on total monomers. The rate of addition of monomers in the invention is regulated so that it does not substantially exceed the rate of conversion of monomer to polymer. In this way, the concentration of unreacted monomers in the reaction vessel is maintained at extremely low levels, e.g., preferably very much less than 1% by weight based on the reaction liquid, although up to about 3% by weight of unreacted monomers is less desirably tolerated. At the more elevated reaction temperature and particularly in the presence of a high but uniformly distributed proportion of catalyst, polymerization is very rapid and, at the higher temperatures permitted by the invention, is substantially instantaneous. A reaction rate producing a 95% conversion within 1–2 minutes represents a preferred lower limit of reaction rate.

It is desired to point out that by proceeding incrementally at elevated reaction temperature and in the presence of a high concentration of catalyst, the polymerization reaction is effected at high speed with substantially complete conversion of monomer to copolymer. Surprisingly, the danger of explosion is completely avoided. Interestingly, a dangerous and explosive reaction is safely conducted by proceeding properly while using high reaction temperatures and high concentrations of catalyst leading to much faster reactions than are usual in procedures fraught with danger. This is a most unique and important achievement. Moreover, the use of high temperatures and high catalyst concentrations leads to the production of still lower molecular weight and the maintenance of reaction temperature permits greater uniformity of product characteristics.

The incremental addition procedure is desirably effected utilizing a solvent such as p-cymene which boils at a temperature sufficiently high to cause the copolymer particles to precipitate in a fluid molten condition. In this way, minimum molecular weight is achieved, the reaction is carried out with extreme rapidity, monomer-containing solutions of high concentration are safely handled (conveniently 20%), the fluid molten condition of the copolymer permits the necessary vigorous mechanical agitation, and the addition of monomer-containing solution with the resultant exothermic heat of polymerization supplies the heat required to maintain the boiling condition. Moreover, high rates of addition of the monomer-containing solution may be used since the excess heat generated is carried away by the boiling solvent and any cooling desired may be performed in an external reflux condenser. Despite the rapidity of copolymer production, substantially complete conversions of monomers to copolymer may be obtained. This is indeed unusual in polymer processes.

In contrast with the prior art, the utilization of reaction temperatures in excess of 90° C., preferably above 100° C., coupled with the use of catalyst concentrations in the range of 2–5% by weight based on monomers, enables a rate of monomer-containing solution addition which permits the volume of a given reactor to be replaced in less than three hours whether operating on a batch or continuous basis. Using preferred conditions the reactor volume can be replaced in less than 1 hour.

The molar ratio of styrene to maleic anhydride which are reacted may vary considerably, as previously indicated. Usually, a copolymer is produced in which the molar ratio of styrene and maleic anhydride is substantially 1:1 and, in many instances and ignoring solvent termination, it seems reasonable to conclude that the copolymer is a heteropolymer. However, the invention includes copolymers of low solution viscosity in which the molar ratio of monomers which are reacted is within the range of 2:1 to 1:2. The invention also includes polymers containing up to about 12% by weight of combined solvent terminating agent. Preferably, the molar ratio of styrene and maleic anhydride monomers which are reacted is substantially 1:1 although a molar excess of up to about 5% of styrene relative to maleic anhydride is desirably present and the copolymer product contains from 2 to about 12% by weight of combined solvent terminating agent.

The process of the invention is desirably carried out by first producing a solvent solution containing dissolved styrene and maleic anhydride monomers and peroxide polymerization catalyst in which the monomers are substantially unreacted. Thus, a 20% solution of monomers may be provided by mixing maleic anhydride with the selected solvent and warming with agitation to a temperature of 50–55° C. until the maleic anhydride is dissolved. The solution so obtained is then filtered, if necessary, and styrene is added with mixing to provide a homogeneous solution containing a substantially 1:1 ratio of monomers. A peroxide catalyst such as benzoyl peroxide is then simply stirred into the solution to dissolve the same easily. These solutions, when maintained at a temperature of 45–50° C., are stable and the monomer reactants remain in solution without polymerizing for a reasonable time, sufficient to permit commercial operation.

While polymerization generally occurs at temperatures above about 75° C. (using the common free-radical generating catalyst benzoyl peroxide or other peroxide of similar activity), it will be understood that the minimum temperature of polymerization as well as the preferred temperature of polymerization will vary with the specific catalyst selected. Thus, catalysts such as 1-hydroxy cyclohexyl hydrogen peroxide or the use of peroxides with accelerators such as cobalt salts, e.g., cobalt nuodate, or amines, e.g., dimethyl aniline, permit the use of lower polymerization temperatures; generally this is not viewed as desirable in the invention. Similarly, catalysts such as acetone peroxide which provide free-radical reactivity and stability at higher temperatures enable higher reaction temperatures to be more effectively used but the minimum reaction temperature is elevated. The preferred solvents in the invention may be oxidized under controlled conditions to form peroxides or other free-radicals in situ and such peroxides may in part or in whole replace the peroxides normally used.

Various other organic peroxides such as dilauryl peroxide, di-tertiary butyl peroxide, diacetyl peroxide, acetyl benzoyl peroxide, tertiary butyl hydroperoxide, cumene hydroperoxide, etc., may be used as well as other free-radical generating catalysts such as azo compounds illustrated by azodiisobutyronitrile.

The proportion of catalyst will also vary with the catalyst which is selected and the reaction temperature which is employed. Broadly, the catalyst may be used in an amount of from 0.05–5.0% and even higher concentrations up to about 10% by weight of benzoyl peroxide or corresponding equivalent proportion of other free-radical generating catalyst based on total monomers may be used. As previously indicated, considerations of safety in the enmasse procedure limit the catalyst concentration to up to about 1% based on monomers. In the incremental procedure safety, speed of reaction, rate of monomer addition and low molecular weight are all favored by higher catalyst concentration in excess of 2%, as previously indicated.

The organic solvent selected in accordance with the invention comprises a monocyclic hydrocarbon nucleus of six carbon atoms substituted with at least one alkyl radical containing at least two carbon atoms and in which the alpha carbon atom of the alkyl radical contains at least one hydrogen substituent. The solvent should be capable of dissolving under the conditions of reaction the styrene and maleic anhydride monomer components and incapable of dissolving the styrene-maleic anhydride copolymer in appreciable quantities. Moreover, the organic solvent should be free of such unsaturation enabling copolymerization with styrene or maleic anhydride and the cyclic hydrocarbon nucleus should be free of substituents reactive with the syrene or maleic anhydride monomers under the conditions of polymerization.

The preferred monocyclic hydrocarbon nucleus is a benzene nucleus and derivatives of benzene such as ethylbenzene or cumene are preferred in comparison with non-aromatic compounds such as p-menthane or p-menthene which are usable in accordance with the invention.

Among the aromatic derivatives which may be selected, it is particularly preferred to employ isopropyl-substituted benzenes such as cumene and the various cymenes, e.g., o-, m-, and p-cymenes alone or in admixture with one another. The alkyl-substituted benzenes which may be selected are not restricted to monoalkyl-substituted products. Thus, diisopropyl benzene and triisopropyl benzene are illustrative of polyalkyl-substituted benzenes which may be used. The solvents are also not limited to alkyl-substituted compounds. Thus, 4-methoxy-1-isopropyl benzene and 4-butoxy-1-isopropyl benzene may be used. Aromatic substituents may also be present as in the compounds diphenyl methane and diphenyl ethane (both sym. and unsym.). The substitution of the monocyclic hydrocarbon nucleus is not limited to carbon, hydrogen and oxygen and other saturated substituents which are not reactive under the conditions of polymerization with the styrene and maleic anhydride monomers may be used. For example, halogen-containing compounds such as monochloro cymene, monofluoro cymene or monobromo cymene may be selected. Still other functional groups may be tolerated such as nitro derivatives, e.g., 4-isopropyl-1-methyl-2-nitro benzene.

Preferred solvents have the following structural formula

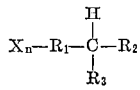

in which: $R_1$ represents a monocyclic hydrocarbon having six carbon atoms in the ring structure; $R_2$ is an alkyl, aryl or alkaryl radical in which the alkyl carbon chain contains from one to four carbon atoms; $R_3$ is hydrogen or an alkyl radical of from one to four carbon atoms; X is a substituent inert to styrene and maleic anhydride under the conditions of polymerization (preferably selected from the group of halogen, nitro radicals, alkyl radicals containing up to five carbon atoms and alkoxy radiuals containing up to five carbon atoms); and $n$ is an integer from 0–5.

Stated in different language, the solvent which is employed comprises an organic compound in which a carbon atom is attached to a six membered carbocyclic ring, one of the remaining valences of said carbon atom being attached to hydrogen, the second remaining valence of said carbon atom being attached to a radical selected from the group consisting of alkyl, aryl or alkaryl in which the alkyl carbon chain contains from 1–4 carbon atoms, and the last remaining valence of said carbon atom being attached to hydrogen or an alkyl radical of from 1–4 carbon atoms, said carbocyclic ring being free of substituents other than a substituent selected from the group of halogen, nitro radicals, alkyl radicals containing up to 5 carbon atoms and alkoxy radicals containing up to 5 carbon atoms and said carbocyclic ring further being free of such unsaturation enabling copolymerization with styrene or maleic anhydride under the conditions of polymerization.

Solvents having a boiling point above the melting point of the copolymer product in the selected solvent are particularly advantageous for the production of copolymers of minimum molecular weight since this enables reaction at atmospheric pressure under reflux conditions at maximum temperature.

As previously indicated, polymerization reaction temperatures causing fusion of precipitated copolymer particles and the production of a taffy-like mass should be avoided. Such undesired temperatures will vary with the solvent selected as well as with the purity of the styrene used. Using the substantially pure styrene available in large quantities in commerce and selecting cumene as solvent, temperatures up to about 125° C. may be used without fusion. At higher temperatures up to the boiling point at 152° C., fusion and agglomeration to a taffy-like mass take place using cumene. With p-cymene, temperatures up to above 134° C. may be used without fusion. From 134–155° C. fusion takes place producing an undesired taffy-like mass. Above about 155° C. and particularly at the reflux temperature of 176° C., the copolymer product comes out of solution as a fluid molten mass which is easily stirred or agitated.

In the enmasse procedure high conversions of monomers to copolymer usually require the continuation of the polymerization reaction after the exotherm has subsided. Thus, the use of heat to maintain, and preferably increase, reaction temperature for a period of 1 to 3 hours is preferred. In the incremental procedure, when using higher reaction temperatures and higher catalyst concentrations, conversions are much faster and the need to continue the polymerization reaction to achieve high conversions is substantially lessened. Indeed, at the higher reaction temperatures in excess of 150° C., the need to continue the polymerization reaction after the exotherm has subsided may be eliminated with substantially complete conversion of monomer to copolymer. Indeed, it has been observed that using the most preferred conditions may result in yields in excess of 100%, e.g., up to 110%, the excess over 100% indicating solvent terminating agent chemically combined in the copolymer product.

The incremental reaction procedure, particularly at the higher reaction temperatures, may be operated with sufficient rapidity such that the need for external heat is eliminated once the reaction has been initiated. If desired, however, the rate of addition of monomers may be slowed and external heat supplied to maintain the desired temperature or the rate of addition of monomers may be increased and external cooling employed to permit the desired temperature to be maintained. As will be obvious, this latter operation is particularly adapted to operation at reflux temperature.

Upon completion of the polymerization reaction, the styrene-maleic anhydride copolymer which is insoluble in the selected solvent is easily separated from the reaction liquid. Thus, the insoluble product settles to the bottom of the liquid, and may be drawn off with only a small amount of solvent. Vacuum filtration will remove most of the solvent and air drying or more preferably, drying under vacuum, will remove most of the remaining solvent. At low reaction temperatures the product is a free flowing powdery white solid. At high reaction temperatures the product is drawn off as a molten mass which cools to form an easily comminuted solid.

The following examples are given by way of illustration and not by way of limitation. All parts and percentages are by weight.

*Example I (Enmasse)*

A solution containing maleic anhydride and styrene monomers dissolved in technical grade ethylbenzene in equimolar proportions and at 20% solids and containing 0.25 part of benzoyl peroxide per 100 parts of total monomers was slowly heated with good agitation in a flask provided with a stirrer, a thermometer and a reflux condenser to 80° C. After an induction period of 10–15 minutes a cloud formed and precipitation of heteropolymer increased along with the development of an exothermic reaction. Heating was then stopped and cooling applied to maintain a temperature of 85° C. to thereby prevent an explosive reaction. When the exotherm subsided, the mixture was heated to 105° C. for 3 hours. The mixture was then cooled, filtered to remove heteropolymer and dried to provide a yield of 96%+.

*Example II (Enmasse)*

Example I was repeated using cumene instead of ethylbenzene. After the exotherm had subsided the mixture was heated and maintained in the range of 105–120° C. for 2 hours. The mixture, after cooling, filtering to remove heteropolymer product and drying, produced a yield of 97%+.

*Example III (Incremental)*

A kettle of 30 gallon capacity and provided with agitation equipment and a jacket adapted to provide heating or cooling was charged with approximately 7 gallons of cumene, and the kettle contents heated and maintained at a temperature of approximately 108° C.

In a separate tank approximately 17.6 pounds of maleic anhydride briquettes were dissolved in approximately 13 gallons of cumene. The maleic anhydride-cumene solution was heated to approximately 53° C. and upon disappearance of the briquettes the solution was filtered and approximately ¾ pound of insoluble maleic acid was recovered. Approximately 18.3 pounds of styrene monomer were added to the clear filtrate representing approximately 1% excess by weight over a 1:1 molar ratio of styrene to maleic anhydride. After stirring to produce a homogeneous solution and cooling to 48° C., 390 grams of benzoyl peroxide were added and dissolved by stirring to provide approximately 2.4% benzoyl peroxide by weight of total monomers present.

The resulting monomer-containing solution was metered into the 30 gallon reaction kettle at a rate of about 0.26 gallon per minute. There was substantially no induction period. After about 20-24 minutes of substantially continuous addition of monomer-containing solution, the "pot temperature" leveled off to a running temperature in the range of 115-120° C. The time for addition of approximately 15 gallons of monomer-containing solution was about 68 minutes. Heating and agitation of the reaction mixture were continued for an additional hour while maintaining the "pot temperature" between about 115° C. and 120° C. When the temperature of the reaction mixture had cooled to 100° C., the resultant heteropolymer product was drawn off, separated from residual solution by centrifuging and dried to provide 35.7 pounds of heteropolymer for a yield of approximately 102%. By boiling point elevation procedure a molecular weight of 1680 was calculated for the product of this example.

*Example IV (Incremental)*

Example III was repeated using p-cymene as the solvent in place of cumene. The temperature of the initial p-cymene charge was 132° C. and the temperature was maintained at 132-134° C. during the entire time of monomer-containing solution addition which was added at the rate of 0.5 gallon per minute, the total time of addition being about 35 minutes. 36.0 pounds of heteropolymer were recovered for a yield of 103%.

*Example V (Incremental Molten Mass)*

Example IV was repeated with the exception that the initial charge of p-cymene was at substantially the boiling point (about 176° C.) and the reaction kettle was fitted with a reflux condenser so that p-cymene vapors could be condensed and returned to the reaction mixture. The monomer-containing solution was added at the rate of about 3 gallons per minute, 15 gallons of solution being added within about 5 minutes, while the liquid reaction mixture boiled within the kettle. The reaction was substantially instantaneous. Following the addition of 15 gallons of monomer-containing solution to the kettle, the molten mass of heteropolymer product which had formed within the kettle was allowed to settle to the bottom of the kettle where it was drawn off. Some of the molten product adhered to the walls and agitator and after cooling it was scraped off and added to the remainder of the product. The molten product was allowed to cool to form a solid mass which was air dried and then broken up to form a particulate heteropolymer product. The yield was 111.5% indicative of complete reaction of styrene and maleic anhydride and also substantially complete termination of the heteropolymer by p-cymene. The residual liquid remaining in the kettle was suitable to either constitute the hot initial solvent medium in the kettle for a further batch (such procedure would normally be considered semi-continuous) or to be recycled for use in the preparation of fresh monomer-containing solution. In point of practice, part of the residual solvent liquid would be used to constitute hot initial charge while the remainder could be recycled to form fresh monomer-containing solution. By boiling point elevation procedure a molecular weight of 1238 was calculated for the product of this example.

To more specifically characterize the new copolymers of the invention, Table I compares viscosities of various copolymers prepared by reacting enmasse 1.5 mols of maleic anhydride and 1.5 mols of styrene, in the presence of 0.75 grams of benzoyl peroxide, in about 1200 grams of an organic solvent maintained with cooling at about 85° C. When the heat of polymerization is completely evolved, the solution is heated to 105° C. for 3 hours. Using benzene as solvent, the temperature was maintained at about 80° C., the reflux temperature. In the first column of the table there is indicated the organic solvent medium in which the copolymerization is carried out. In the second column there is indicated the comparative viscosity, measured in seconds, of a 10% by weight solution of the copolymer dissolved in pure acetone. The viscosity value of pure acetone is 19 seconds so that the viscosity values reported in seconds are meaningful so long as the solids content of the acetone solution is known and it is understood that the term "comparative viscosity" as used herein has reference to a viscosity value for pure acetone of 19 seconds.

Viscosity values in seconds were measured by timing the descent of a standard glass spherical "tear drop" through the solvent or the solution of the polymer in acetone contained in a standard glass tube—length 37¾", inside diameter—5/10". The glass "tear drop" has a diameter slightly less than the internal diameter of the tube. The temperature is controlled at 25° C.

TABLE I

| Solvent: | Comparative viscosity at 10% solids, sec. |
|---|---|
| Benzene | 300 |
| Toluene | 46 |
| Toluene-naphtha (equal volumes) | 46 |
| Ethylbenzene | 27 |
| Cumene | 26 |

As will be evident, the solution viscosities of interest in the invention are very much lower than can be obtained with commonly used solvents other than those of the invention and are close to the viscosity of pure acetone (19 seconds) so that considerable variation in copolymer product is compressed within a few seconds of time. To more accurately depict the solution viscosity picture, comparative viscosities were also measured at 15% solids and the values obtained are reported in Table II.

TABLE II

| Solvent | Process | Temp. | Comparative Viscosity at 15% Solids, seconds | 10% (Viscosity in Centistokes) |
|---|---|---|---|---|
| Ethylbenzene | Enmasse | Ex. I | 77.8 | 6.34 |
| Cumene | do | Ex. II | 60.8 | 5.43 |
| Ethylbenzene | Incremental | 136° C. (Reflux) | 23 | 0.86 |
| Cumene | do | 115-120° C. (Ex III) | 22.2 | 0.772 |
| p-Cymene | do | 132° C. (Ex. IV) | 22.2 | 0.786 |
| Do | do | Reflux (Ex. V) | 21.1 | 0.72 |

NOTE.—A solution of 10 grams of copolymer dissolved in acetone to form 100 milliliters of solution is referred to in this table and also in the claims as a 10% solution.

The unique applicability of styrene-maleic anhydride copolymers of low solution viscosity to low pressure molding processes in admixture with aliphatic polyhydric compounds has previously been referred to. A more extensive discussion of low pressure molding utilizing mixtures containing the copolymers of the invention will be found in my prior applications Serial No. 637,855, filed February 4, 1957, and Serial No. 710,624, filed January 23, 1958, the disclosures of which are hereby incorporated.

The new copolymers of the invention are also adapted to various other important utilities. Thus, the new copolymers may be used in adhesives and binders, coatings for paper, ceramic, leather, textiles and the like, soil stabilizers, thickeners for dye paste printing compositions, and in the preparation of improved water emulsions and dispersions for coating and detergent application. For example, the lower average molecular weight of the copolymers of the invention permits the preparation of aqueous solutions of the polymer with alkali metal, ammonium or organic bases which have a greater solubility and a lower viscosity in water than the corresponding salts of the relatively high molecular weight copolymers conventionally prepared from such solvents as benzene or xylene.

In the field of solution coatings, the copolymers of the invention, by virtue of their acid anhydride reactivity, constitute valuable components of coating compositions in which they may be dissolved in various solvents. Acetone, methyl ethyl ketone, cyclohexanone, acetophenone, isophorone and dimethyl formamide are particularly effective solvents for the copolymers of the invention. The lower and more uniform molecular weight of the copolymers of the invention enables improved stability and compatibility in solution and solutions of higher solids content at any given viscosity.

If desired, the copolymers of the invention may be reacted with a monohydric alcohol to form half-esters or partial half-esters and these are also useful, such as in coating compositions in admixture with other resinous film-forming materials, particularly those which are reactive with the carboxyl radical. The copolymers of the invention may also have various vinyl monomers grafted thereupon to provide polymeric products of varying properties.

The invention is defined in the claims which follow.

I claim:

1. A chain terminated copolymer of styrene and maleic anhydride in molar proportions of substantially 1:1, said copolymer being solid at room temperature, having a solution viscosity in 10% solution in acetone of up to 1 centistoke and melting unsharply at a temperature of less than 225° C.

2. A copolymer as recited in claim 1 in which said copolymer is terminated by an organic compound having a carbon atom attached to a six membered carbocyclic ring, one of the remaining valences of said carbon atom being attached to hydrogen, the second remaining valence of said carbon atom being attached to a radical selected from the group consisting of alkyl, aryl or alkaryl in which the alkyl carbon chain contains from 1–4 carbon atoms, and the last remaining valence of said carbon atom being attached to hydrogen or an alkyl radical of from 1–4 carbon atoms, said carbocyclic ring being free of substituents other than a substituent selected from the group of halogen, nitro radicals, alkyl radicals containing up to 5 carbon atoms and alkoxy radicals containing up to 5 carbon atoms.

3. A chain terminated copolymer of styrene and maleic anhydride in molar proportions of substantially 1:1, said copolymer being solid at room temperature, having a solution viscosity in 10% solution in acetone of up to 1 centistoke and melting unsharply at a temperature of less than 255° C.

4. A dry chain terminated copolymer of styrene and maleic anhydride in molar proportions of substantially 1:1, said copolymer being solid at room temperature, having a solution viscosity in 10% solution in acetone of up to 1 centistoke and melting unsharply at a temperature of less than 225° C.

References Cited in the file of this patent

UNITED STATES PATENTS

| | | |
|---|---|---|
| 2,047,398 | Voss et al. | July 14, 1936 |
| 2,230,240 | Gerhart | Feb. 4, 1941 |
| 2,286,062 | Condo | June 9, 1942 |
| 2,430,313 | Vana | Nov. 4, 1947 |
| 2,496,384 | De Nie | Feb. 7, 1950 |
| 2,606,891 | Rowland | Aug. 12, 1952 |
| 2,640,819 | Barrett | June 2, 1953 |
| 2,675,370 | Barrett | Apr. 13, 1954 |
| 2,744,098 | Towne | May 1, 1956 |
| 2,756,219 | Van der Plas et al. | July 24, 1956 |
| 2,838,475 | Barrett | June 10, 1958 |
| 2,866,771 | Sellers | Dec. 30, 1958 |
| 2,913,437 | Johnson | Nov. 17, 1959 |

OTHER REFERENCES

Schildknecht: Vinyl and Related Copolymers, Wiley and Sons (1952), pages 14 and 15.